Jan. 4, 1949.    H. F. BOHL    2,458,244
CUTTING TOOL
Filed June 18, 1943    2 Sheets-Sheet 2
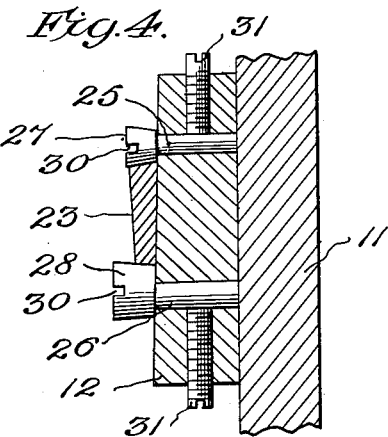
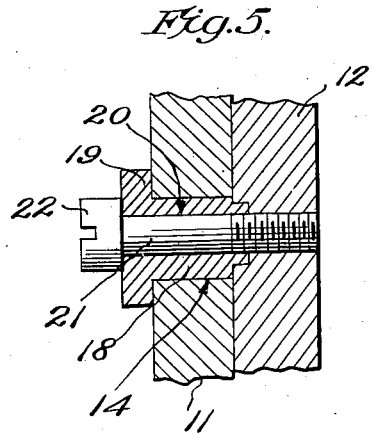
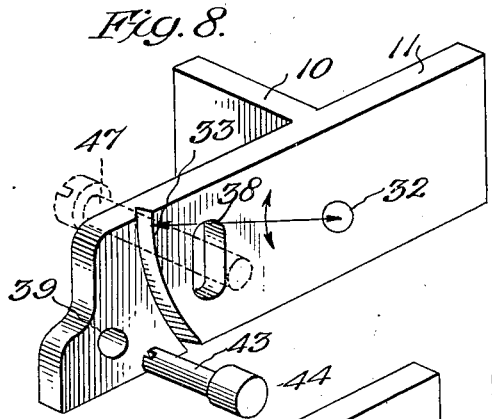
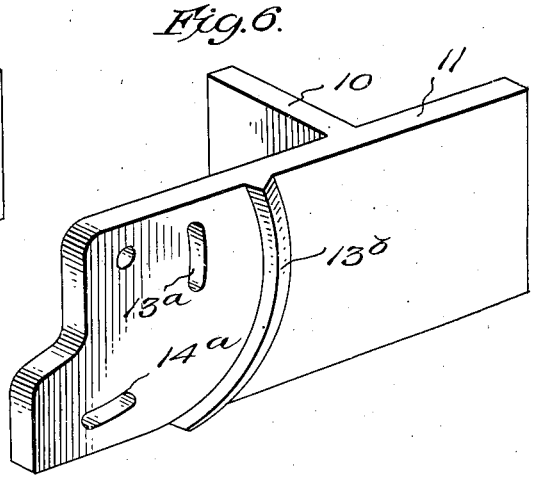
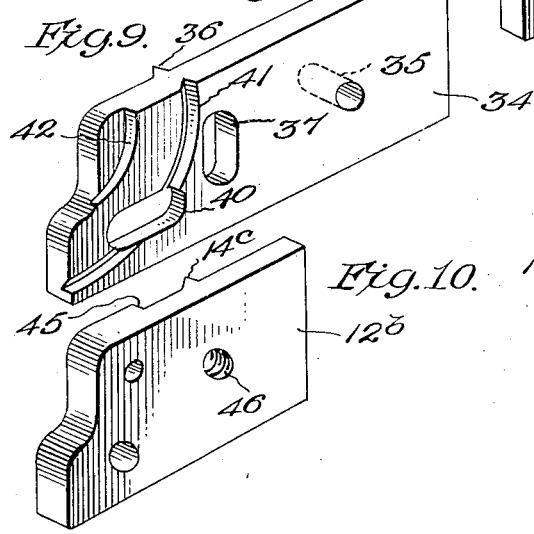
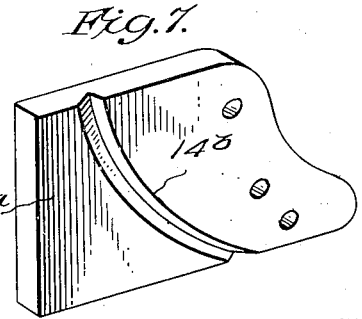
INVENTOR.
HERMANN F. BOHL,
BY
Anthony William Deller
ATTORNEY.

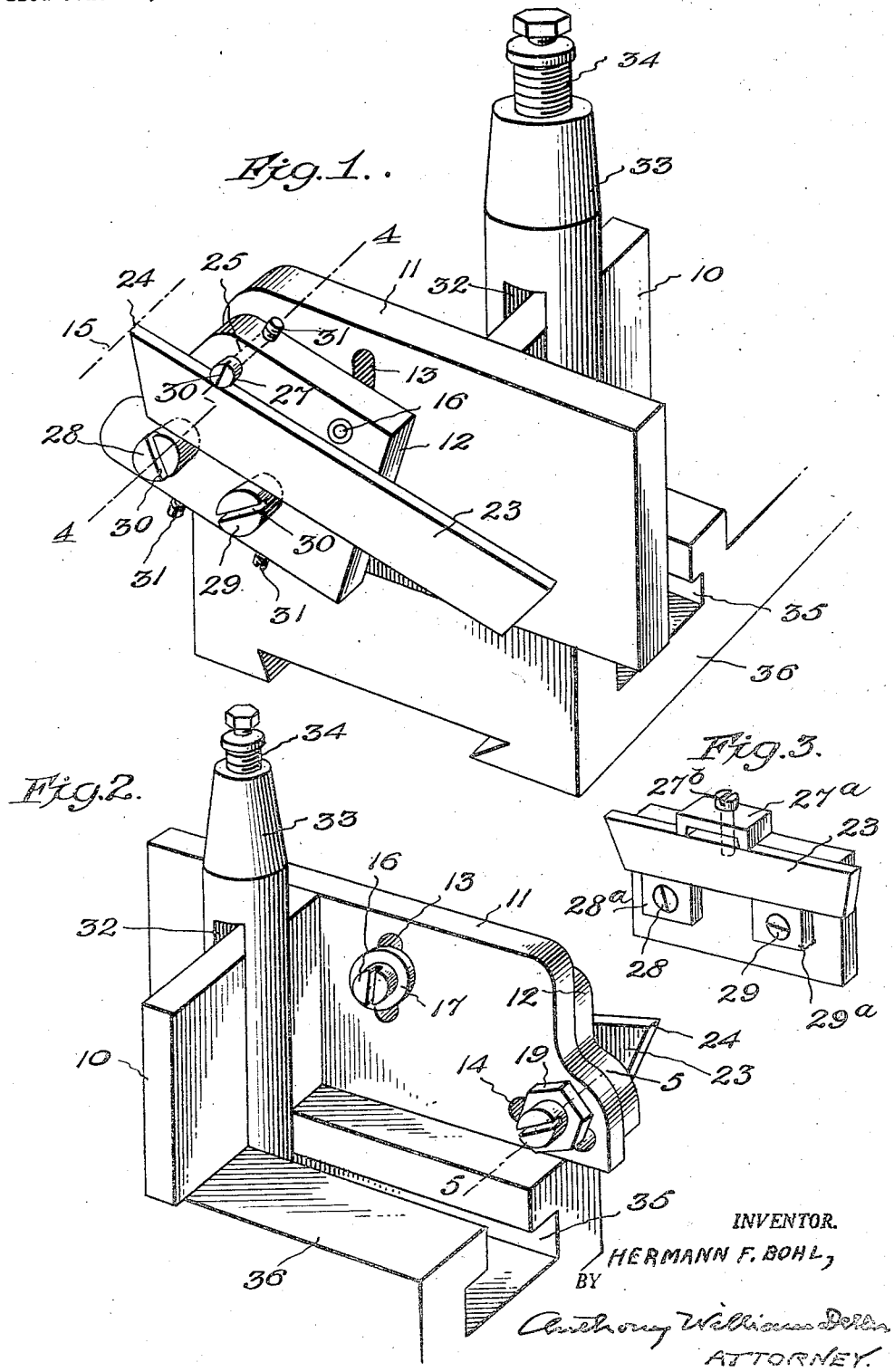

Patented Jan. 4, 1949

2,458,244

UNITED STATES PATENT OFFICE 2,458,244

CUTTING TOOL

Hermann F. Bohl, Palisade, N. J.

Application June 18, 1943, Serial No. 491,362

8 Claims. (Cl. 29—98)

The invention relates to cutting tools and more particularly to cutting tools for use in lathes and other machines.

The invention has for its object to provide a novel cutting tool of simple construction which is capable of being easily and effectively mounted in place in the lathe or other machine.

The invention contemplates further the provision of a novel cutting tool of the indicated type in which chattering and other objectionable features are avoided when the tool is in use, and in which the cutting blade is rigidly supported in operative cutting position.

Another object of the invention is to provide a novel cutting tool in which tedious adjustments of the holder in so-called change-overs are avoided, and which readily permits selection of the correct back rake for different materials without bringing the cutting edge of the blade out of center and in which clearing angles are accurately and correctly maintained without difficulty.

A further object of the invention is to provide a novel cutting tool in which cutting blades of varying widths may be easily and efficiently accommodated.

Other objects will appear from the description hereinafter and the features of novelty will be pointed out in the claims.

In the accompanying drawings, which illustrate examples of the invention without defining its limits, Fig. 1 is a perspective view of the novel cutting tool;

Fig. 2 is a similar view looking in the opposite direction;

Fig. 3 is a perspective view, on a reduced scale, of another form of the novel tool;

Fig. 4 is a fragmentary sectional view on the line 4—4 of Fig. 1;

Fig. 5 is a similar view on the line 5—5 of Fig. 2;

Figs. 6 and 7 are perspective views showing another form of the novel tool, and

Figs. 8, 9 and 10 are perspective views showing still another form of said tool.

Referring more particularly to Figs. 1 and 2, the novel cutting tool comprises a preferably T-shaped support consisting of a stem 10 and a transverse member 11 which in the preferred form constitute integral parts of each other. A blade-holder 12 is mounted in surface engagement with the outer face of the member 11 so as to be pivotally adjustable or swivelled thereon.

For this purpose the transverse member 11, in the illustrated example, is provided with curved slots 13 and 14 curved about the lathe center indicated by the broken line 15 in Fig. 1. A screw 16 passing through a washer 17 and the slot 13 into threaded engagement with the blade-holder 12, and an eccentric means in co-operation with the slot 14 serve to adjustably secure the blade-holder 12 in place on the transverse member 11. It will be understood that the curved slots 13 and 14 and their associated elements may be replaced, at will, by other means whereby equivalent results are attained.

The eccentric means referred to above comprises a bushing 18 mounted in the slot 14 and having a flange 19 in surface engagement with the transverse member 11. The bushing 18 is provided with an eccentric bore 20 for the accommodation of a screw 21 threaded into the blade-holder 12 and having an enlarged head 22 in engagement with the flange 19 of said bushing 18 as shown in Fig. 5. The purpose of the aforesaid eccentric means will be set forth more fully hereinafter.

In the preferred arrangement, the blade-holder 12 is of such cross-sectional form that its outer faces slope upwardly as shown in Fig. 4, when said blade-holder 12 is in place on the outer face of the member 11.

The novel cutting tool further comprises a cutting blade 23 which may be of conventional type including a cutting edge 24 as illustrated in Fig. 1 and preferably is provided with bevelled longitudinal edges, and is slightly wedge-shaped in cross-section as shown in Fig. 4. The cutting blade 23 may be secured in place on the blade-holder 12 in any suitable manner preferably so as to be adjustable thereon and preferably by means designed to accommodate blades 23 of different transverse dimensions. In the example illustrated in Fig. 1, the blade-holding means comprises studs 25, 26, 26 rotatably mounted in the blade-holder 12 and provided respectively with eccentric heads 27, 28 and 29 in surface engagement with the blade-holder 12 and provided with slots 30 or equivalent means to facilitate rotative adjustment for the purpose to be more fully described hereinafer. As shown in Fig. 4 the peripheral surfaces of the heads 27, 28 and 29 taper toward the respective studs to fit the bevelled longitudinal edges of the blade 23. The studs 25 and 26 with their respective heads 27, 28 and 29 are fixed against movement relatively to the holder 12 by set screws 31, or in any other convenient manner.

In the preferred arrangement the studs 26 of which there are two in the illustrated example, are located in spaced relation in substantial alignment with each other, and the stud 25 is spaced above and in intermediate relation to the studs 26 as shown in Fig. 1, so that the heads 27, 28 and 29 constitute three point clamping means as will appear more fully hereinafter.

In its operative position the blade 23 lies in surface engagement with the sloping outer surface of the blade-holder 12 between the heads 27, 28 and 29 of the studs 25, 26, 26. As illustrated in Fig. 1, the head 27 engages the upper edge of the blade 23 while the heads 28 and 29 engage the lower edge thereof. The blade 23 is set in position on the blade-holder 12 to bring the cutting edge 24 to the lathe center 15 or to an equivalent operative position in another machine. The blade 23 is fixed in position by rotating the stud 25 about its axis to force the blade 23 against the heads 27, 28 and 29 which previously have been adjusted to a set position dependent upon the transverse width of the particular blade 23. The heads 27, 28 and 29 thereby develop three-point clamping forces on opposite edges of the blade 23 whereby the latter is secured in position on the blade-holder 12. The tapering surfaces of the heads 27, 28 and 29 in co-operation with the bevelled longitudinal edges of the blade 23 force the latter into firm and rigid surface engagement with the blade-holder 12. The set screws 31 serve to fix said studs 25 and 26, 26 against movement with their heads 27, 28 and 29 in the aforesaid clamping positions.

An alternative three-point clamping means is illustrated in Fig. 3 in which the eccentric tapering heads 28 and 29 rotatably fit into correspondingly tapering openings of rectangular blocks 28a and 29a, while the head 27 and its stud 25 are replaced by a clamping block 27a. The latter preferably is recessed on its lower surface as shown in Fig. 3 and in any case is attached to the blade-holder 12 by a screw 27b so as to project outwardly beyond the same.

With this arrangement the one longitudinal edge of the blade 23 is engaged by the blocks 28a and 29a while the opposite longitudinal edge of said blade 23 is engaged by the clamping block 27a. The blocks 27a, 28a and 29a grip the blade 23 and develop three-point clamping forces thereon in the same way as in Fig. 1, and in addition provide maximum bearing and gripping surfaces for said blade 23.

The novel cutting tool is mounted in a lathe by inserting the stem 10 through the customary slot 32 of the conventional tool post 33 and fixing it therein by means of the customary set screw 34. The tool post 33 is mounted in the usual slot 35 of the tool rest 36 of the lathe in the well known way.

In practice, the blade 23 is adjusted to bring the cutting edge 24 to a cutting position in which the point of said blade 23 registers with the imaginary centre of the slots 13 and 14, and with the blade-holder 12 set in the proper back-rake position, after which the cutting operation is proceeded with in the well known way.

The slots 13 and 14 being curved about the lathe center 15 and consequently about the point of the cutting edge 24 of the blade 23, the arcuate adjustment of the blade-holder 12 which is possible, enables said cutting edge 24 to be set in the most efficient cutting position without difficulty and without requiring any particular skill on the part of the operator.

The arrangement also enables the blade-holder 12 to swivel to any practical back rake in the curved slots 13 and 14. In these adjustments the height of the cutting edge 24 is not changed because the two curved slots 13 and 14 have a common center. When necessary or desired the height of the cutting edge 24 may be varied by suitably adjusting the bushing 18 to thereby raise or lower the blade-holder 12 and with it the blade 23 at the cutting edge end thereof. This adjustment is important in that it enables the cutting edge 24 to be properly set particularly after said cutting edge 24 has been ground to resharpen the blade 23.

The three-point clamping of the cutting tool 23 provides a support of maximum rigidity and assists in avoiding the development of chattering during operative use of the tool. At the same time the cutting operation is carried on efficiently and defective and poor cuts are avoided.

The clamping means by setting the eccentric heads 28 and 29, or the blocks 28a and 29a, in different positions, also permits cutting blades 23 of different transverse widths to be readily and efficiently accommodated in the tool without difficulty.

In the novel cutting tool the cutting blade 23 is supported to an increased degree of rigidity over existing types of corresponding tools.

At the same time the novel arrangement permits the selection of the correct and most efficient back rake for different materials without bringing the cutting edge 24 out of center, and keeps the clearing angles correctly.

In addition, the correct cutting position is maintained in so-called change-overs, and cutting blades 23 of varying transverse widths are easily and efficiently accommodated.

As shown in Figs. 6 and 7, the transverse member 11 in addition to curved slots 13a and 14a corresponding to the slots 13 and 14, may be provided with a curved rib 13b curved about the same center. In such case the blade-holder 12 is formed with a curved groove 14b having the same curve and radius as the rib 13b and of corresponding cross-sectional form to accommodate said rib 13b. In this form the rib 13b and groove 14b in co-operation with the slots 13a and 14a with the associated elements enable the blade-holder 12a to be pivotally adjusted or swivelled on the member 11 in the same way and for the same purposes as previously set forth herein with respect to Figs. 1 and 2.

In the form shown in Figs. 8, 9 and 10, the novel tool comprises a corresponding T-shaped support consisting of a stem 10 and a transverse member 11 as in the forms previously described herein. As shown in Fig. 8 the transverse member 11 is provided with a circular aperture 32 and a curved groove 33 having the center of the aperture as its center.

A secondary member 34 is provided with a stud 35 dimensioned to fit into the aperture 32, with a curved rib 36 having the same radius as the groove 33 and adapted to fit into the same. The member 34 further is provided with an elongated opening 37 which in the assembled condition of the parts, registers with a corresponding elongated opening 38 with which the transverse member 11 is provided.

The latter further includes an opening 39 arranged to register with an elongated slot 40 formed in the secondary member 34 where the parts are assembled. In addition the secondary member 34 includes a curved groove 41 and a curved shoulder 42 both curved about the lathe center indicated by the broken line 15 in Fig. 1.

The form of the novel tool now being described is provided in addition with an eccentric means similar in purpose to the eccentric means of Fig. 1 and consisting of a stem or stud 43 rotatably mounted in the opening 39 of the member 11 and having an eccentric head 44 which projects into the slot 40 of the secondary member 34 when the parts are assembled. Suitable means is provided for rotating the stud 43 on its axis, as by forming a cut 45 in the end thereof.

In addition to the parts so far described the tool shown in Figs. 8, 9 and 10 includes a blade-holder 12b which is provided with a curved rib 14c having the same radius of curvature as the groove 41 of the secondary member 34 and adapted to slidably fit the same. The blade-holder 12b also includes a curved shoulder 45 having the same radius of curvature as the shoulder 42 of the secondary member 34 and arranged to slidably fit the same in the assembled condition of the parts. An internally-threaded hole 46 is provided in the blade-holder 12b for registry with the registering openings 37 and 38 of the secondary member 34 and transverse member 11 respectively. In addition, the blade-holder 12b includes means for clamping the blade, such as the blade 23 thereon which means may be the same as previously described herein.

In the assembled condition the secondary member 34 lies in surface engagement with the transverse member 11, with the curved rib 36 fitted into the curved groove 33 and the stud 35 projecting into the aperture 32.

The stud 43 of the eccentric means is mounted in the opening 39 of the transverse member 11 with the eccentric head 44 located in the slot 40 of the secondary member 34. The parts are preferably so designed and dimentioned that the end face of the eccentric head 44 lies approximately flush with the surface of the secondary member 34.

The blade-holder 12b in turn lies in surface engagement with the secondary member 34 with the curved rib 14c fitted into the curved groove 41 and the shoulder 45 in overlapping engagement with the shoulder 42. The parts are secured together in the assembled condition by means of a screw 47 which passes from the rear of the transverse member 11 through the registering openings 38 and 37 and is threaded into the opening 46 of the blade-holder 12b.

When it is desired to vary the height of the cutting blade such as 23 which may be mounted on the blade-holder 12b in the same way as hereinbefore described, it is simply necessary to loosen the screw 47 and then to rotate the stud 43 on its axis, for instance, by means of a screwdriver. This will correspondingly rotate the eccentric head 44 in the slot 40 and consequently will pivotally swing the secondary member 34 on the stud 35. As a result the blade-holder 12b which partakes of the movements of the member 34 will raise or lower the blade at the cutting edge end thereof. The parts may be fixed in the adjusted position by simply tightening the screw 47.

In some forms of the novel tool, such as shown for instance in Figs. 6 and 7, the slot 14a may, if desired, be omitted.

In all cases the blade 23 is preferably of customary tapering form in cross-section, with the outer face of the blade-holder sloped as hereinbefore set forth.

Although the present invention has been described in conjunction with a preferred embodiment, it is to be understood that modifications and variations may be resorted to without departing from the spirit and scope of the invention, as those skilled in the art will readily understand. Thus, it is to be observed that the curved slots with their associated elements, and the curved ribs and associated curved grooves may be replaced by other arrangements whereby equivalent results are attained. Such variations and modifications are considered to be within the purview and scope of the claims.

I claim:

1. A cutting tool of the kind described comprising a T-shaped support including a stem adapted for connection with the tool post of a conventional lathe and a transverse member fixed on said stem, said transverse member being provided with curved slots having the lathe center as a center, a blade-holder located in surface engagement with said transverse member, mounting means co-operating with said slots for pivotally mounting said blade-holder on said transverse member and for fixing said blade-holder in place thereon, studs rotatably mounted on said blade-holder in three point relation to each other, eccentric heads carried by said studs and projecting outwardly beyond said blade-holder to provide three-point clamping supports, and a cutting blade engaged on its opposite longitudinal edges by said eccentric heads and clamped in place thereby on said blade-holder, one of said mounting means including an eccentric device whereby said blade-holder is adjusted relatively to said transverse member to selectively raise and lower the cutting edge of said cutting blade.

2. A cutting tool of the kind described comprising a T-shaped support including a stem adapted for connection with the tool post of a conventional lathe and a transverse member fixed on said stem, a blade-holder located in surface engagement with asid transverse member, mounting means for pivotally mounting said blade-holder on said transverse member and for fixing said blade-holder in place thereon, studs rotatably mounted on said blade-holder in three point relation to each other, eccentric heads carried by said studs and projecting outwardly beyond said blade-holder to provide three-point clamping supports, and a cutting blade engaged on its opposite longitudinal edges by said eccentric heads and clamped in place thereby on said blade-holder, said mounting means including an eccentric device whereby said blade-holder is adjusted relatively to said transverse member to selectively raise and lower the cutting edge of said cutting blade.

3. A cutting tool of the kind described comprising a support adapted to be mounted in operative position in a lathe, a tool holder pivotally mounted on said support to swivel about the lathe center, three-point clamping means on said tool holder, and a cutting tool engaged on its opposite longitudinal edges by said three-point clamping means and clamped in place thereby on said tool-holder.

4. A cutting tool of the kind described comprising a support adapted to be mounted in operative position in a lathe, a tool holder pivotally mounted on said support, a cutting tool carried by said tool-holder and having a cutting edge, adjustable clamping means on said tool-holder for supporting cutting tools of varying transverse widths on said tool-holder, an adjustable clamping device on said tool-holder co-operating with said clamping means to clamp said cutting-tool on said tool-holder, and means whereby said tool-holder is adjusted relatively to said support to vary the rake of the cutting edge of said cutting tool.

5. A cutting tool of the kind described comprising a support adapted to be mounted in operative position in a lathe, a tool holder pivotally mounted on said support, a cutting member carried by said tool-holder, and eccentrically adjustable three-point clamping means on said tool-holder engaging the opposite longitudinal edges of said cutting member to clamp it in place on said tool-holder, said clamping means being eccentrically adjustable to accommodate cutting members of varying transverse widths.

6. A cutting tool of the kind described comprising a T-shaped support including a stem adapted for connection with the tool post of a conventional lathe and a transverse member fixed on said stem, said transverse member being provided with curved slots having the lathe center as a center, a blade-holder located in surface engagement with said transverse member, mounting means co-operating with said slots for pivotally mounting said blade-holder on said transverse member and for fixing said blade-holder in place thereon, studs rotatably mounted on said blade-holder in spaced relation to each other, eccentric heads carried by said studs and projecting outwardly beyond said blade-holder, a pair of clamping blocks carried by said eccentric heads, a single clamping block secured to said blade-holder and projecting beyond the same in intermediate relation to said pair of clamping blocks, said clamping blocks providing three-point clamping supports, and a cutting blade engaged on its opposite longitudinal edges by said clamping blocks and clamped in place thereby on said blade-holder.

7. A cutting tool of the kind described comprising a T-shaped support arranged to be mounted in a machine, a curved rib on the transverse member of said support, a cutting-blade having a cutting edge, a blade-holder for said cutting-blade provided with a curved groove centered about the true cutting position of the cutting edge of said blade to fit said correspondingly curved rib whereby said blade-holder is pivotally guided on said support, and means for releasably fixing said blade-holder in place on said support.

8. A cutting tool of the kind described comprising a T-shaped support arranged to be mounted in a machine, the transverse member of said support being provided with a stud opening and a curved groove having said opening as its center of curvature, a secondary member arranged to lie in surface engagement with said transverse member, a curved rib on said secondary member adapted to fit the curved groove of said transverse member, a stud on said secondary member arranged to fit into said stud opening to pivotally mount said secondary member on said support, said secondary member including a curved shoulder and a curved groove curved about a common center, a blade-holder arranged to lie in surface engagement with the secondary member, a curved rib on said blade-holder arranged to fit into the curved groove of said secondary member, a curved shoulder on said blade-holder arranged to be in overlapping engagement with the curved shoulder of said secondary member, said transverse member and secondary member having elongated openings adapted to register with each other, and said blade-holder having an internally threaded hole arranged to register with said registering elongated openings, a screw arranged to extend through said elongated openings into threaded engagement with said hole for releasably fastening said support, secondary member and blade-holder in surface engagement with each other, said transverse member having a hole and said secondary member having an elongated slot arranged to register therewith, a stud rotatably mounted in said last mentioned hole, and an eccentric head on said stud located in said elongated slot and arranged to be rotated therein by said stud to thereby pivotally adjust the secondary member and blade-holder on said stud relatively to said transverse member of said support.

HERMANN F. BOHL.

REFERENCES CITED

The following references are of record in the file of this patent:

UNITED STATES PATENTS

| Number | Name | Date |
| --- | --- | --- |
| 745,576 | Darling | Dec. 1, 1903 |
| 748,725 | Hanson | Jan. 5, 1904 |
| 830,635 | Barker | Sept. 11, 1906 |
| 860,802 | Hartness | July 23, 1907 |
| 1,141,854 | VanNorman | June 1, 1915 |
| 1,161,056 | Liebstein | Nov. 23, 1915 |
| 1,303,205 | Johnson | May 6, 1919 |
| 1,681,408 | Johannesmeyer et al. | Aug. 21, 1928 |
| 1,780,607 | Svenson | Nov. 4, 1930 |

FOREIGN PATENTS

| Number | Country | Date |
| --- | --- | --- |
| 361,061 | Germany | Oct. 10, 1922 |